United States Patent [19]
Diebold et al.

[11] 3,714,253
[45] Jan. 30, 1973

[54] 2-AMIDINOHYDRAZONO-GLYOXYANILIDE DERIVATIVES

[75] Inventors: James L. Diebold, Havertown; Milton Wolf, West Chester, both of Pa.

[73] Assignee: American Home Products Corporation, New York, N.Y.

[22] Filed: May 19, 1970

[21] Appl. No.: 38,914

[52] U.S. Cl. ......260/562 N, 260/295 H, 260/296 R, 260/329 AM, 260/332.2 R, 260/347.3, 260/347.7, 260/556 A, 260/556 AR, 260/558 A, 260/559 A, 260/562 A, 260/562 P, 260/564 F, 260/565, 424/324
[51] Int. Cl...............................................C07c 103/30
[58] Field of Search.............................260/562, 558

[56] References Cited

OTHER PUBLICATIONS

Burger, Medicinal Chemistry, 3rd Ed., (Wiley Interscience) Part I, face page, pages 409–423, 522–530, 573 (1970).

*Primary Examiner*—Harry I. Moatz
*Attorney*—Andrew Kafko, Joseph Martin Weigman, Dwight J. Potter, Vito Victor Bellino and Robert Wiser

[57] ABSTRACT

Disclosed are 2-amidinohydrazono-glyoxylanilide derivatives and the method of producing the same by reacting a glyoxanilide oxime and an aminoguanidine in the presence of a strong acid. The 2-amidinohydrazono-glyoxylanilides have pharmacological utility as antitubercular and antitrichomonal agents.

11 Claims, No Drawings

2-AMIDINOHYDRAZONO-GLYOXYANILIDE DERIVATIVES

This invention relates to novel 2-amidinohydrone-glyoxylanilide and the methods for the preparation thereof.

Particularly, the present invention relates to novel 2-amidinohydrazono-glyoxylanilides of the formula:

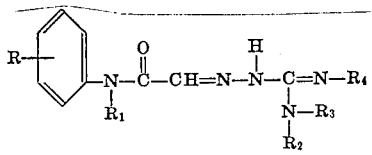

wherein R is selected from the group consisting of hydrogen, halogen, nitro, phenyl, phenoxy, lower alkyl, trifluoromethyl, lower alkoxy, halophenyl, lower alkylphenyl, lower alkoxyphenyl, phen(lower)alkyl, halophenoxy, lower alkylphenoxy, lower alkoxyphenoxy, phenyl(lower)alkoxy, halophenyl(lower)alkoxy, lower alkylphenyl(lower)alkoxy, lower alkoxyphenyl(lower)alkoxy, lower alkanoylamido, benzamido, lower alkylsulfonyl, phenylsulfonyl, halophenylsulfonyl, lower alkoxyphenylsulfonyl, lower alkylphenylsulfonyl, pyridyl, thienyl and furyl; and $R_1$, $R_2$, $R_3$ and $R_4$ are independently selected from the group consisting of hydrogen, lower alkyl, phenyl, lower alkoxyphenyl, lower alkylphenyl, phen(lower)alkyl, lower alkylsulfonyl, phenylsulfonyl, lower alkoxyphenylsulfonyl, lower alkylphenylsulfonyl, phen(lower)-alkylsulfonyl, lower alkylphenyl(lower)alkylsulfonyl, pyridyl, thienyl and furyl.

The expressions "lower alkyl," "lower alkoxy," "lower alkanoyl" and the like as employed herein refer to both branched and straight chain groups containing from one up to about six carbon atoms. The terms "halo" and "halogen" as used herein refer to the halogens; chlorine, iodine, fluorine and bromine.

SYNTHESIS

The compounds of Formula (I) may be prepared by reacting salt, such as, a bicarbonate salt, of an aminoguanidine of the formula:

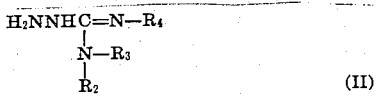

wherein $R_2$, $R_3$ and $R_4$ are as set forth above with a glyoxanilide oxime of the formula:

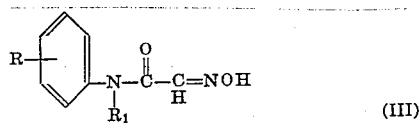

wherein R and $R_1$ are as set forth above by contacting in a reaction inert organic solvent, such as, a lower alkanol (e.g. ethanol) with a strong acid for a time period ranging from about 1 up to about 36 hours at about the reflux temperature of the mixtures. The resulting compounds are recovered by routine procedures, such as, evaporating to produce a residue which is then extracted with a base, e.g. an alkali metal hydroxide followed by extraction with a reaction inert organic solvent, such as, a di(lower)alkylether (e.g. ethyl ether). The solid is then recrystallized from an appropriate suitable organic solvent, such as, a lower alkanol (e.g. ethanol) to provide the purified compound.

The expression "reaction inert organic solvent" refers to an organic solvent which will dissolve the reactants being contacted without interfering with their reaction. The expression "appropriate suitable organic solvent" refers to an organic solvent which will serve the purpose for which it is utilized without adversely affecting the substances with which it is used. Inert organic solvents could include dioxane, dimethylformamide, ethanol, chloroform and ethyl ether and the like. The expression "alkali metal" refers to the well-known alkali metals, e.g., sodium, lithium and potassium. The expression "strong acid" refers to the strong acids commonly accepted by one skilled in the art including the readily dissociable acids, such as, the mineral acids, i.e., hydrochloric acid, sulfuric acid, hydrobromic acid and phosphoric acid and all acids which have a dissociation constant greater than $1 \times 10^{-5}$, e.g., acetic acid, trichloroacetic acid, and oxalic acid; excluded would be acids promoting undesirable side reactions, e.g., releasing hydrogen cyanide.

The starting materials of Formulas (II and III) are well-known in the art and may be prepared by known processes by those skilled in the art. The starting materials of Formula (III) may be obtained by methods described by Sandmeyer in Helv. Chem. Acta 2, 234 (1919).

The compounds of the present invention are antitubercular and trichomonacidal in activity. They therefore are useful in inhibiting the growth of tubercle bacilli and in killing trichomonads.

The tests for antitubercular activity were carried out by preparing 1000 mcg/ml preparation of the substance to be tested in a suitable medium. Serial dilutions of the preparation are made and 1.0 ml quantities of each dilution are incorporated into 9 ml of medium to give final concentrations of .01–100 mcg/ml. The medium is either Dubos Oleic acid liquid medium or Kirchners medium plus Triton A-20. The tubes are then seeded with 0.1 ml of standardized bacterial suspension, from a stock culture maintained on Dorset Egg Agar, and incubated two weeks at 37° C. The endpoint, Minimal Inhibitory Concentration (MIC), is expressed in mcg/ml; the least amount of material that completely inhibits the organism.

The test for trichomonacidal activity is carried out by adding a 12.5 mg portion of test material (as based on active moiety) to 2.5 ml of 1 percent phosphate buffer, pH 6. Further two-fold dilutions are made in the same buffer. A 1 ml. volume of each dilution is transferred to small sterile screw cap assay tubes containing 3.8 ml of Diamond medium (formula furnished by American Type Culture Collection, Rockville, Md.) and 0.1 ml of calf serum. Each assay tube is inoculated with 0.1 ml of a 48–72 hour culture of Trichomonas vaginalis strain ATCC No. 13972. A control assay tube containing no test material is similarly inoculated. The assay tubes are gently shaken and then incubated for 48 hours at 30° C. Following incubation the tubes are gently shaken and with the aid of a Pasteur pipette a drop is deposited on a Spiers-Levy eosinophil counting chamber. The chamber is examined by phase contrast microscopy. The number of organisms present in 1 mm² is multiplied by 5000 in order to express the count per ml. The difference in the number of organisms present in the control tube and in the tubes containing the test material represents the relative potency of the test material and is expressed as the percentage kill at the specific dose level. Metronidazole may be used as a suitable positive control test material.

Certain compounds of the present invention demonstrated activity, in vitro, against Endameba Histolytica when tested by a procedure similar to that described by Thompson et al, Antibio. & Chemo. 6 (1956) 337-50. Particularly active in this test was 2-amidinohydrazono-4'-chloroglyoxanilide.

The compounds of the present invention when used in providing any of the above-described utilities are effective whenever placed in contact with the object organism. Therefore, compositions such as soaps, soapless cleaners, wash solutions, ointments and creams would be forms used to provide the compounds. The provided forms would be effective in affecting the object organisms when used as washes or applied topically to items such as barns, laboratories, tabletops and the surfaces of objects.

The following examples are illustrative of the present invention.

EXAMPLE I

To a solution of aminoguanidine bicarbonate (18.5 g, 0.13 m), concentrated hydrochloric acid (13.3 ml) and 95 percent ethanol (75 ml) is added 4'-chloroglyoxanilide oxime (9.0 g, 0.045 m). The mixture is refluxed for 20 hours and then evaporated. The residue is extracted with a 3 percent sodium hydroxide solution followed by extraction with ethyl ether. The residual solid is recrystallized from absolute ethanol affording 2-amidinohydrazono-4'-chloroglyoxylanilide as a crystalline solid (3.0 g) m.p. 211°–12° C. (uncorrected), with decomposition.

Anal. Calcd for $C_9H_{10}ClN_5O$: C, 44.93; H, 4.19; N, 29.11. Found: C, 45,28; H, 4.09; N, 29.51.

In a similar manner, using the appropriate starting material, the following compounds are provided;

4'-bromo-N-methyl-2-[N,N-dimethyl-N'-(2-phenethyl)-amidinohydrazono]glyoxylanilide;
2-[N-(p-anisyl)-N'-methylamidinohydrazono]-N-phenyl-glyoxylanilide;
2-[N'-ethyl-N-(p-tolyl)amidinohydrazono]-N-(p-ethylphenyl)-3'-nitroglyoxylanilide;
N-benzyl-4'-ethyl-2-[N,N-diethyl-N'-(m-tolyl)-amidinohydrazono]glyoxanilide;
4'-benzyl-2-(N,N'-diphenylamidinohydrazono)-glyoxylanilide.

EXAMPLE II

To a solution of aminoguanidine bicarbonate (20.0 g) concentrated hydrochloric acid (15.0 ml) and 95 percent ethanol (100 ml) is added 4'-bromo-N-mesylglyoxanilide oxime (10.0 g). The mixture is refluxed for 24 hours and then evaporated. The residue is extracted with a 3 percent sodium hydroxide solution followed by extraction with ethyl ether. The residual solid is recrystallized from dioxane affording, 2-amidinohydrazono-4'-bromo-N-mesylgloxylanilide, as a crystalline solid.

In a similar manner, using the appropriate starting materials, the following compounds are provided;

N-ethyl-2-(N-ethylsulfonyl-N'-phenylamidinohydrazono)-3'-phenylglyoxylanilide;
2-[N-(p-ethoxyphenyl)-N'-(phenylsulfonyl)amidinohydrazono]-2'-ethyl-N-phenylglyoxylanilide.
4'-(p-chlorophenyl)-2-(N'-ethylsulfonyl-N-phenylamidinohydrazono)-N-(2-phenethylsulfonyl)glyoxylanilide;
N-benzyl-2-[N'-ethyl-N-(p-ethylbenzyl)sulfonylamidinohydrazono-4'-(2-phenethyl)glyoxylanilide;
3'-(p-anisyl)-N-benzylsulfonyl-2-[N-(p-ethoxyphenyl)-sulfonyl-N'-propylamidinohydrazono]glyoxylanilide;
N-(p-anisyl)-4'-(p-bromophenyl)-2-[N-(2-[p-tolyl]-ethyl)-N'-(phenylsulfonylamidinohydrazono]glyoxylanilide.

EXAMPLE III

To a solution of N-(2-pyridyl)aminoguanidine bicarbonate (26.0 g), concentrated hydrochloric acid (16 ml) and 95 percent ethanol (120 ml) is added glyoxylanilide oxime (12.0 g). The mixture is refluxed for 30 hours and then evaporated. The residue is extracted with a 3 percent sodium hydroxide solution followed by extraction with ethyl ether. The residual solid is recrystallized from absolute ethanol affording as a crystalline solid the compound, 2-[N-(2-pyridyl)amidinohydrazono)-glyoxylanilide.

In a similar manner, using the appropriate starting materials, the following compounds are produced;

4'-chloro-2-[N-ethyl-N'-(p-tosyl)amidinohydrazono-N-(3-pyridyl)glyoxylanilide;
2-[N-benzyl-N'-(3-thienyl)amidinohydrazono]-N-(3-pyridyl)-4'-(p-tolyl)glyoxylanilide;
2-[N'-(p-ethoxyphenyl)-N-(2-thienyl)amidinohydrazono]-N-methyl-3'-nitroglyoxylanilide;
3'-benzyl-2-[N,N-diethyl-N'-(4-pyridyl)amidinohydrazono]-N-mesylglyoxylanilide;
2-[N-(p-anisyl)-N'-(3-furyl)amidinohydrazono]-4'-(p-bromophenyl)-N-(p-ethylphenyl)glyoxylanilide;
2-[N-(2-furyl)-N'-(p-tolyl)amidinohydrazono]-N-phenyl-p-glyoxyltoluidide;
2-(N-mesyl-N'-methyl)amidinohydrazono-3'-phenoxy-N-(3-thienylglyoxylanilide.

EXAMPLE IV

To a solution of aminoguanidine bicarbonate (18.5 g., 0.0454 m), concentrated hydrochloric acid (13.3 ml) and 95 percent ethanol (75 ml) is added 2'-chloroglyoxanilide oxime (9.0 g, 0.0454 m). The mixture is refluxed for 20 hours and then evaporated. The residue is extracted with a 3 percent sodium hydroxide solution followed by extraction with ethyl ether. Recrystallization of the crude product from absolute ethanol gives a crystalline solid (3.6 g), 2-amidinohydrazono-2'-chloroglyoxylanilide, m.p. 216'–217° C. (uncorrected), with decomposition.

Anal. Calcd for $C_9H_{10}ClN_5O$: C, 44.93; H, 4.19; N, 29.11. Found: C, 45.35; H, 4.16; N, 28.93.

In a similar manner, using the appropriate starting materials, the following compounds are provided;

2-[N,N'-di(p-anisyl)amidinohydrazono]-N-ethyl-4'-fluoroglyoxylanilide;

N-(o-anisyl)-2-[N'-(p-ethylphenyl)-N,N-dipropyl-
amidinohydrazono]-2'-iodoglyoxylanilide;
4'-cyano-2-[N,N'-di(p-ethoxyphen-
yl)amidinohydrazono]-N-(p-tolyl)glyoxylanilide;
2-[N'-benzyl-N-(p-ethylphenyl)-N-
methylamidinohydrazono]-N-(p-ethoxyphenyl)-p-
glyoxyltoluidide;
2-[N-benzyl-N-ethyl-N'-hexylamidinohydrazono]-3'
-fluoro-N-(2-phenethyl)glyoxylanilide;
2-[N'-butyl-N-(2-phenethyl)amidinohydrazono]-4'-
(2-phenethyl)glyoxylanilide.

EXAMPLE V

To a solution of 1-amino-3-mesylguanidine bicarbonate (22.0 g), concentrated sulfuric acid (20.0 ml) and 95 percent ethanol (100 ml) is added 4'-chloroglyoxanilide oxime (10.0 g). The mixture is refluxed for 28 hours and then evaporated. The residue is extracted with a 4 percent potassium hydroxide solution followed by extraction with chloroform. Recrystallization of the crude product from absolute ethanol gives a crystalline solid, 4'-chloro-2-(N-mesylamidinohydrazono)glyoxylanilide.

In a similar manner, using the appropriate starting materials, the following compounds are provided:
2-[N'-(p-anisyl)-N-(ethylsulfo-
nyl)amidinohydrazono]-N-(p-tosyl)-4'-(2-
phenethyl)glyoxylanilide;
2-(N'-benzyl-N,N-diethylamidinohydrazono)-3'-
ethyl-N-(p-anisylsulfonyl)glyoxylanilide;
N-mesyl-2-[N'-(2-[p-tolyl]ethylsulfonyl)-N-(2-
phenethyl)amidinohydrazono]4'-(2-
phenethyl)glyoxylanilide;
N-(o-anisyl)-2-[N-butyl-N'-(p-ethylphenylsulfonyl)-
amidinohydrazono]-p-glyoxyltoluidide;
2-[N-(p-anisylsulfonyl)-N'-(phenylsulfo-
nyl)amidinohydrazono]-N-benzyl-4'-(p-
tolyl)glyoxylanilide;
2-[N-benzyl-N'-(p-tolyl)amidinohydrazono]-N-
benzylsulfonyl-3'-(p-fluorophenyl)glyoxylanilide.

EXAMPLE VI

To a solution of aminoguanidine bicarbonate (21.0 g, 0.154 m), concentrated hydrochloric acid (13.3 ml) and 95 percent ethanol (75 ml) is added o-glyoxanisidide oxime (12.0 g, 0.0615 m). The mixture is refluxed for 20 hours and then evaporated. The residue is extracted with a 3 percent sodium hydroxide solution followed by extraction with ethyl ether. Recrystallization of the crude product from 95 percent ethanol gives a crystalline solid, 2-amidinohydrazono-o-glyoxylanisidide, m.p. 199°–200° C. (uncorrected), with decomposition.

Anal. Calcd for $C_{10}H_{13}N_5O_2$: C, 51.07; H, 5.57; N, 29.74. Found: C, 50.60; H, 5.52; N, 29.38.

In a similar manner, using the appropriate starting materials, the following compounds are provided:
4'-ethoxy-N-(p-ethoxyphenyl)-2-[N,N-diethyl-N'-
(p-ethoxyphenyl)amidinohydrazono]glyoxylani-
lide;
2-[N-methyl-N'-(2-phenethyl)amidinohydrazono]-
3'-phenoxy-N-phenylglyoxylanilide;
2-[N'-(p-anisyl)-N-phenylamidinohydrazono]-4'-(p-
chloro)phenoxy-N-propylglyoxanilide;
3'-(o-bromo)phenoxy-2-[(N,N-
dipropyl)amidinohydrazono]glyoxylanilide;
2-[N'-(p-anisyl)-N-ethyl-N-(4-phenbu-
tyl)amidinohydrazono]-N-ethyl-4'-(p-
iodo)phenoxyglyoxylanilide;
N-(m-anisyl)-3'-(o-fluoro)phenoxy-2-[N-methyl-N'-
phenyl-N-(3-phenpropyl)amidinohydrazono]
glyoxylanilide;
N-benzyl-2-[N'-benzyl-N-(p-
tolyl)amidinohydrazono]-3'-(p-tolyloxy)glyox-
ylanilide;
2-[N-ethyl-N-(2-phenethyl)-N'-(m-
tolyl)amidinohydrazono]-4'-(p-ethyl)phenoxy-N-
(3-phenpropyl)glyoxylanilide;
3'-(p-anisyloxy)-2-(N,N-dibutyl-N'-
propylamidinohydrazono)glyoxylanilide;
2-(N'-methyl)amidinohydrazono-N-(4-phenbutyl)-
3'-(p-propoxy)phenoxyglyoxylanilide;
4'-benzyloxy-N-methyl-2-[N-methyl-N'-(4-phenbu-
tyl)-N-phenylamidinohydrazono]glyoxylanilide;
3'-(2-phenyl)ethoxy-N-propyl-2-(N-
propylamidinohydrazono)glyoxylanilide;
4'-(p-chloro)benzyloxy-2-[N-(p-ethyl)phenyl-N'-(3-
phenpropyl)amidinohydrazono]-N-(p-tolyl)glyox-
ylanilide;
2-[N'-(p-anisyl)-N-(p-ethoxyphen-
yl)amidinohydrazono]-4'-[3-(p-iodophen-
yl)propoxy]-N-phenylglyoxylanilide;
N-benzyl-2-(N'-benzyl-N,N-
dimethyl)amidinohydrazono-4'-[2-(p-
bromophenyl)ethoxy]glyoxylanilide;
N-(o-anisyl)-2-[N'-ethyl-N-(2-
phenethyl)amidinohydrazono]3'-(p-
fluorobenzyloxy)glyoxylanilide;
2-[N-ethyl-N-(p-tolyl)amidinohydrazono]-4'-[2-(p-
tolyl)ethoxy]glyoxylanilide;
N-(p-anisyl)-3'-(p-ethyl)benzyloxy-2-(N'-propyl-
amidinohydrazono)glyoxylanilide;
2-(N,N-diethyl-N'-phenylamidinohydrazono)-3'-(p-
methoxy)benzyloxy-N-(2-phenethyl)glyoxylani-
lide;
2-[N'-(p-ethoxyphenyl)-N-ethyl-N-(p-propoxyphen-
yl)-amidinohydrazono]-3'-[2-(p-ethoxyphen-
yl)ethoxy]-N-(p-ethylphenyl)-glyoxylanilide.

EXAMPLE VII

To a solution of 1-amino-3-mesylguanidine bicarbonate (24.0 g), concentrated hydrobromic acid (20.0 ml) and 95 percent ethanol (100 ml) is added 4'-(p-iodophenoxy)glyoxanilide oxime (12.0 g). The mixture is refluxed for 30 hours and then evaporated. The residue is extracted with a 3 percent sodium hydroxide solution followed by extraction with ethyl ether. Recrytallixation of the crude product from 95 percent ethanol gives a crystalline solid, 4'-(p-iodophenoxy-2-(N-mesylamidinohydrazono)-glyoxylanilide.

In a similar manner, using the appropriate starting materials, the following compounds are provided:
N-(p-anisylsulfonyl)-2-[N-ethylsulfonyl-N'-(p-
tolyl)-amidinohydrazono]-4'-[2-(p-tolyl)ethoxy
]glyoxylanilide;
2-(N-ethoxysulfonyl-N'-ethylamidinohydrazono)-3'-
phenoxy-N-(p-tolyl)glyoxyanilide;
N-benzyl-2-[N-mesyl-N'-(p-
tosyl)amidinohydrazono]-4'-(p-tolyloxy)glyox-
ylanilide;

2-[N-benzyl-N'-(p-ethoxyphenylsulfo-
  nyl)amidinohydrazono]-N-(p-tosyl)glyox-
  ylanisidide;
3'(p-anisyloxy)-2-[N-(p-ethylphenyl)-N'-
  mesylamidino-hydrazono]-N-(o-tosyl)glyoxylani-
  lide;
2-[N,N-dimethyl-N'-(p-tosyl)amidinohydrazono]-N-
  phenyl-4'-(m-tolyloxy)glyoxylanilide;
3'-(p-ethylphenoxy)-N-mesyl-2-[N'-(2-phenethyl)-
  N-(p-tosyl)glyoxylanilide.

EXAMPLE VIII

To a solution of N-(2-pyridyl)aminoguanidine bicarbonate (28.0 g), concentrated hydrochloric acid (18.0 ml), and 95 percent ethanol (120.0 ml) is added o-glyoxyanisidide oxime (15.0 g). The mixture is refluxed for 26 hours and then evaporated. The residue is extracted with a 3 percent sodium hydroxide solution followed by extraction with ethyl ether. Recrystallization of the crude product from 95 percent ethanol gives a crystalline solid, 2-[N-(2-pyridyl)amidinohydrazono]-o-gyloxylanisidide.

In a similar manner, using the appropriate starting materials, the following compounds are provided:
  2-[N'-mesyl-N-(2-thienyl)amidinohydrazono]-N-
    phenyl-4'-(p-tolyloxy)glyoxylanilide;
  3'[2-(p-anisyl)ethoxy]-2-[N'-(3-furyl)-N,N-
    dimethyl-amidinohydrazono]-N-mesylglyoxylani-
    lide;
  2-[N-benzyl-N'-(3-thienyl)amidinohydrazono]-4'-
    (2-phenylethoxy)-N-(3-pyridyl)glyoxylanilide;
  3'-(p-anisyloxy)-2-(N-mesyl-N'-
    methylamidinohydrazono]-N-(3-thienyl)glyox-
    ylanilide;
  2-[N-ethyl-N'-(p-tosyl)amidinohydrazono]-3'-
    phenoxy-N-(3-pyridyl)glyoxylanilide;
  4'-(p-chlorobenzyloxy)-2-[N-(2-furyl)-N'-(p-tolyl)-
    amidinohydrazono]-N-(p-tosyl)glyoxylanilide;
  3'-(p-bromophenoxy)-N-methyl-2-[N'-(4-pyridyl)-
    N-(p-tosyl)amidinohydrazono]glyoxylanilide.

EXAMPLE IX

To a solution of aminoguanidine bicarbonate (24.0 g), concentrated phosphoric acid (20.0 ml) and 95 percent ethanol (120 ml) is added 4'-acetamidoglyoxanilide oxime (15.0 g). The mixture is refluxed for 20 hours and then evaporated. The residue is extracted with a 3 percent sodium hydroxide solution followed by extraction with ethyl ether. Recrystallization of the crude product from 95 percent ethanol gives a crystalline solid, 2-amidinohydrazono-4'-acetamido-glyoxylanilide.

In a similar manner, using the appropriate starting materials, the following compounds are prepared;
  2-[N-benzylsulfonyl-N'-(3-
    pyridyl)amidinohydrazono]-N-methyl-4'-
    (propionylamido)glyoxylanilide;
  3'-butyrylamido-2-[N-ethyl-N'-(p-
    tosyl)amidinohydrazono]-N-mesylglyoxylanilide;
  4'-benzamido-2-[N'-methyl-N-(4-
    pyridyl)amidinohydrazono-N-(m-tosyl)glyoxylani-
    lide;
  3'-acetamido-2-(N'-benzylsulfonyl-N,N-
    dimethylamidinohydrazono)-N-(p-ethylphenylsul-
    fonyl)glyoxylanilide;
  N-benzylsulfonyl-2-[N,N-diethyl-N'-(p-
    tosyl)amidinohydrazono]-4'-
    (propionylamido)glyoxylanilide;
  4'-butyrylamido-2-(N-ethyl-N'-mesyl-N-phen-
    ylamidinohydrazono)-N-(2-thienyl)glyoxylanilide;
  3'-benzamido-N-(2-furyl)-2-[N-phenyl-N'-(3-thie-
    nyl)-amidinohydrazono]glyoxylanilide;
  4'-acetamido-N-(p-anisyl)-2-[N-ethylsulfonyl-N'-(p-
    tosyl)amidinohydrazono]glyoxylanilide;
  2-[N-(m-ethoxyphenyl)-N'-(3-fu-
    ryl)amidinohydrazono]-3'-propionylamido-N-(p-
    tolylethylsulfonyl)glyoxylanilide;
  2-[N'-benzyl-N-(2-phenethylsulfo-
    nyl)amidinohydrazono]-4'-butyrylamido-N-
    (phenylsulfonyl)glyoxylanilide;
  N-(p-anisylsulfonyl)-4'-benzamido-2-[N'-(p-ethyl-
    benzylsulfonyl)-N-(p-ethylphen-
    yl)amidinohydrazono]glyoxylanilide;
  4'-acetamido-2-[N-(p-ethoxyphenylsulfonyl)-N'-(2-
    pyridyl)amidinohydrazono]-N-(2-
    phenethyl)glyoxylanilide.

EXAMPLE X

To a solution of aminoguanidine bicarbonate (22.0 g), concentrated hydrochloric acid (20.0 ml) and 95 percent ethanol (100 ml) is added 4'-mesylglyoxanilide oxime (14.0 g). The mixture is refluxed for 20 hours and evaporated to dryness. The residue is extracted with a 5 percent potassium hydroxide solution followed by extraction with ethyl ether. Recrystallization of the crude product from 95 percent ethanol gives a crystalline solid, 2-aminohydrazono-4'-mesylglyoxylanilide.

In a similar manner, using the appropriate starting materials, the following compounds are provided:
  2-(N,N-diethyl-N'-mesylamidinohydrazono)-4'-
    ethylsulfonyl-N-(3-pyridyl)gloxylanilide;
  2-[N,N-dimethyl-N'-(p-tosyl)amidinohydrazono]-3'
    -phenylsulfonyl-N-(2-pyridyl)glyoxylanilide;
  2'(N'-benzyl-N-ethyl-N-phenylamidinohydrazono)-
    N-(p-ethylbenzylsulfonyl)-3'-(p-tosyl)glyoxylani-
    lide;
  2-[N'-(p-anisyl)-N-(2-pyridyl)amidinohydrazono]-
    N-(p-tolylethylsulfonyl)-4'-(o-tosyl)glyoxylani-
    lide;
  4'-(p-chlorophenylsulfonyl)-2-[N-(p-ethoxyphenyl)-
    N'-(o-tolyl)amidinohydrazono]-N-(2-phenethyl-
    sulfonyl)glyoxylanilide;
  N-benzylsulfonyl-4'-(m-bromophenylsulfonyl)-2-
    [N-(3-furyl)-N'-(p-tolyl)amidinohydrazono]g
    lyoxylanilide;
  2-[N-(p-ethylphenyl)-N'-(3-fu-
    ryl)amidinohydrazono]-N-(p-ethylphenylsulfo-
    nyl)-3'-(p-iodophenylsulfonyl)glyoxylanilide;
  2-[N-benzyl-N'-(2-furyl)amidinohydrazono]-4'-(p-
    fluorophenylsulfonyl)-N-(p-tosyl)glyoxylanilide;
  3'-p-anisylsulfonyl)-N-(p-ethoxyphenylsulfonyl)-2-
    [N-(2-phenethylsulfonyl)-N'-(3-thie-
    nyl)amidinohydrazono]glyoxylanilide;
  N-(m-anisylsulfonyl)-4'-(p-ethoxyphenylsulfonyl)-2-
    [N-ethylsulfonyl-N'-(2-thie-
    nyl)amidinohydrazono]glyoxylanilide;
  4'-(p-ethylphenylsulfonyl)-2-[N-mesyl-N'-(4-
    pyridyl)-amidinohydrazono]-N-(phenylsulfo-
    nyl)glyoxylanilide.

EXAMPLE XI

To a solution of aminoguanidine bicarbonate (26.0 g), concentrated hydrochloric acid (18.0 ml) and 95 percent ethanol (120.0 ml) is added 4'-(2-pyridyl)glyoxanilide oxime (15.0 g). The mixture is refluxed for 24 hours and then evaporated. The residue is extracted with a 3 percent sodium hydroxide solution followed by extraction with ethyl ether. Recrystallization of the crude product from dioxane provides the product, 2-amidinohydrazono-4'-(2-pyridyl)glyoxylanilide.

In a similar manner, using the appropriate starting materials, the following compounds are provided;

N-(3-furyl)-2-[N-methyl-N'-(4-pyridyl)amidinohydrazono]-4'-(2-pyridyl)glyoxylanilide;

2-(N'-ethyl-N-phenylamidinohydrazono)-N-mesyl-3'-(2thienyl)glyoxylanilide;

4',N-di(3-furyl)-2-[N-methyl-N-phenyl-(p-tosyl)-amidinohydrazono]glyoxylanilide;

N-(2-furyl)-2-[N,N-dimethyl-N'-(2-thienyl)amidinohydrazono]-3'-(3-thienyl)glyoxylanilide;

2-[N,N-diethyl-N'-(3-pyridyl)amidinohydrazono]-N-(2-furyl)-4'-(3-pyridyl)glyoxylanilide;

2-[N'-(p-ethylbenzylsulfonyl)-N-methyl-N-(p-tolyl)-amidinohydrazono]-N-(2-pyridyl)-4'-(3-thienyl)glyoxylanilide;

N-methyl-2-[N-(2-phenethylsulfonyl)-N'-(p-tolylethyl-sulfonyl)amidinohydrazono]-3'-(3-pyridyl)gloxylanilide;

N-(o-anisyl)-2-[N-(p-ethylphenylsulfonyl)-N'-(p-tosyl)-amidinohydrazono]-4'-(3-furyl)glyoxylanilide;

N-benzylsulfonyl-2-[N-(p-ethoxyphenylsulfonyl)-N'-mesylamidinohydrazono]-3'-(4-pyridyl)glyoxylanilide;

2-[N'-(p-anisylsulfonyl)-N-mesylamidinohydrazono]-N-phenylsulfonyl-3'-(3-pyridyl)glyoxylanilide;

4'-(2-furyl)-2-[N-mesyl-N'-(2-phenethyl)amidinohydrazono]ylanilide;

2-N'-benzyl-N-(phenylsulfonyl)amidinohydrazono]-N-ethylsulfonyl-4'-(4-pyridyl)glyoxylanilide;

2-[N'-(p-anisylsulfonyl)-N-(p-ethylphenyl)amidinohydrazono]-N-(2-pyridyl)-3'-(4-pyridyl)glyoxylanilide;

N-ethyl-2-[N-(4-pyridyl)-N'-(p-tolyl)amidinohydrazono]-3'-(3-thienyl)glyoxylanilide;

N-(p-ethoxyphenyl)-4'-(2-furyl)-2-[N-methyl-N'-(2-thienyl)amidinohydrazono]glyoxylanilide;

2-[N-(p-anisyl)-N'-phenylamidinohydrazono]-4'-(2-thienyl)-N-(3-thienyl)glyoxylanilide;

2-[N'-ethyl-N-(3-furyl)amidinohydrazono]-N-methyl-3'-(2-thienyl)glyoxylanilide.

We claim:
1. A compound of the formula:

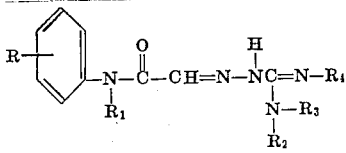

wherein R is selected from the group consisting of hydrogen, halogen, nitro, phenyl, phenoxy, lower alkyl, trifluoromethyl, and lower alkoxy, [halophenyl, lower alkylphenyl, lower alkoxyphenyl, phen(lower)alkyl, halo phenoxy, lower alkylphenoxy, lower alkoxyphenoxy, phenyl(lower)alkoxy, halophenyl(lower)alkoxy, lower alkylphenyl(lower)alkoxy, lower alkoxyphenyl(lower)alkoxy, lower alkanoylamido, or benzamido]; and $R_1$, $R_2$, $R_3$, and $R_4$ are independently selected from the group consisting of hydrogen, lower alkyl, or phen(lower)alkyl.

2. A compound according to claim 1, which is: 2-amidinohydrazono-4'-chloroglyoxylanilide.

3. A compound according to claim 1, which is: 2-amidinohydrazono-2'-chloroglyoxylanilide.

4. A compound according to claim 1, which is: 2-amidinohydrazono-o-glyoxylanisidide.

5. A process for the production of a compound of the formula:

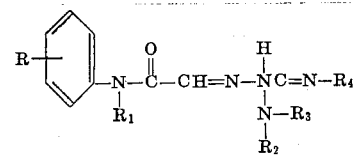

wherein R is selected from the group consisting of hydrogen, halogen, nitro, phenyl, phenoxy, lower alkyl, trifluoromethyl, and lower alkoxy, [halophenyl, lower alkylphenyl, lower alkoxyphenyl, phen(lower)alkyl, halophenoxy, lower alkylphenoxy, lower alkoxyphenoxy, phenyl(lower)alkoxy, halophenyl(lower)-alkoxy, lower alkylphenyl(lower)alkoxy, lower alkoxyphenyl(lower)alkoxy, lower alkanoylamido, or benzamido]; and $R_1$, $R_2$, $R_3$ and $R_4$ are independently selected from the group consisting of hydrogen, lower alkyl, or phen(lower)alkyl, which comprises contacting a compound of the formula:

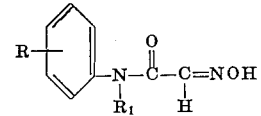

wherein R and $R_1$ are set forth above with a compound of the formula:

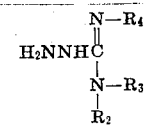

wherein $R_2$, $R_3$ and $R_4$ are as set forth above by heating in a reaction inert organic solvent at about the reflux temperature of the mixture for a time from about one up to about 36 hours with an acid having a dissociation constant greater than $1 \times 10^{-5}$.

6. The process of claim 5 wherein the reaction inert organic solvent is a lower alkanol.

7. The process of claim 5 wherein the acid is hydrochloric acid.

8. The process of claim 5 wherein the salt is a bicarbonate salt.

9. The process of claim 5 wherein the compound is recrystallized.

10. The process of claim 5 wherein the compound is recrystallized from a lower alkanol.

11. The process of claim 5 wherein the compound is recrystallized from ethanol.

* * * * *